US010146950B2

(12) United States Patent
Kochhar et al.

(10) Patent No.: US 10,146,950 B2
(45) Date of Patent: Dec. 4, 2018

(54) SYSTEMS FOR MODULAR DOCUMENT EDITING

(71) Applicant: AIRWATCH LLC, Atlanta, GA (US)

(72) Inventors: Arjun Kochhar, Bangalore (IN);
Lakshmikanth Raju, Bangalore (IN);
Manjunath Bhat, Bangalore (IN);
Marcos Mendez, Atlanta, GA (US)

(73) Assignee: AIRWATCH LLC, Atlanta, GA (US)

( * ) Notice: Subject to any disclaimer, the term of this patent is extended or adjusted under 35 U.S.C. 154(b) by 299 days.

(21) Appl. No.: 15/009,837

(22) Filed: Jan. 29, 2016

(65) Prior Publication Data

US 2017/0076101 A1    Mar. 16, 2017

(30) Foreign Application Priority Data

Sep. 10, 2015 (IN) ............................ 4817/CHE/2015

(51) Int. Cl.
*G06F 21/62* (2013.01)
*G06F 17/21* (2006.01)
*G06F 17/24* (2006.01)

(52) U.S. Cl.
CPC ........ *G06F 21/6209* (2013.01); *G06F 17/212* (2013.01); *G06F 17/24* (2013.01)

(58) Field of Classification Search
CPC ..... G06F 21/6209; G06F 17/212; G06F 17/24
See application file for complete search history.

(56) References Cited

U.S. PATENT DOCUMENTS

| | | | | |
|---|---|---|---|---|
| 5,910,987 A * | 6/1999 | Ginter | ..................... | G06F 21/10 348/E5.006 |
| 6,052,785 A * | 4/2000 | Lin | ......... | G06F 21/33 709/225 |
| 7,051,212 B2 * | 5/2006 | Ginter | ..................... | G06F 21/10 380/231 |
| 7,076,652 B2 * | 7/2006 | Ginter | ..................... | G06F 21/10 348/E5.006 |
| 7,100,199 B2 * | 8/2006 | Ginter | ..................... | G06F 21/10 348/E5.006 |
| 7,917,749 B2 * | 3/2011 | Ginter | ..................... | G06F 21/10 713/150 |
| 2008/0114797 A1 * | 5/2008 | Jones | ................... | G06F 17/2205 |
| 2009/0292930 A1 * | 11/2009 | Marano | ............... | G06F 21/6218 713/189 |
| 2009/0327294 A1 * | 12/2009 | Bailor | ...................... | G06F 17/24 |
| 2012/0030187 A1 * | 2/2012 | Marano | ............... | G06F 21/6218 707/709 |
| 2013/0212250 A1 * | 8/2013 | Kleppner | ............... | G06Q 10/10 709/224 |

(Continued)

*Primary Examiner* — Luu T Pham
*Assistant Examiner* — James J Wilcox
(74) *Attorney, Agent, or Firm* — Clayton, McKay & Bailey, PC

(57) ABSTRACT

Systems herein allow a content manager to share portions of a document with different groups of users. The system can parse the document into screen shots of each page along with an information bundle that describes how to format content on each page. When a user accesses a document, the system can send the user a permitted portion rather than the entire document. The permitted portion can include one or more screen bundle. The user device can execute an application that reads the information bundle and formats content for display on the user device.

17 Claims, 9 Drawing Sheets

(56) References Cited

U.S. PATENT DOCUMENTS

| | | | | |
|---|---|---|---|---|
| 2014/0122217 A1* | 5/2014 | Hills | .................. | G06Q 30/0239 |
| | | | | 705/14.39 |
| 2014/0215297 A1* | 7/2014 | Grosfeld | ............. | G06F 17/2205 |
| | | | | 715/209 |
| 2014/0283012 A1* | 9/2014 | Eggerton | ................ | G06F 21/31 |
| | | | | 726/19 |
| 2015/0302329 A1* | 10/2015 | Yuvienco | ........... | G06Q 10/0639 |
| | | | | 705/7.38 |
| 2015/0310126 A1* | 10/2015 | Steiner | ................ | G06F 17/2247 |
| | | | | 715/204 |
| 2015/0310188 A1* | 10/2015 | Ford | ....................... | G06F 21/10 |
| | | | | 726/28 |
| 2016/0124929 A1* | 5/2016 | Kharbanda | ........... | G06F 17/243 |
| | | | | 715/223 |
| 2017/0090734 A1* | 3/2017 | Fitzpatrick | .......... | G06F 17/3089 |
| 2018/0181549 A1* | 6/2018 | Hileman | ............. | G06F 17/2247 |

* cited by examiner

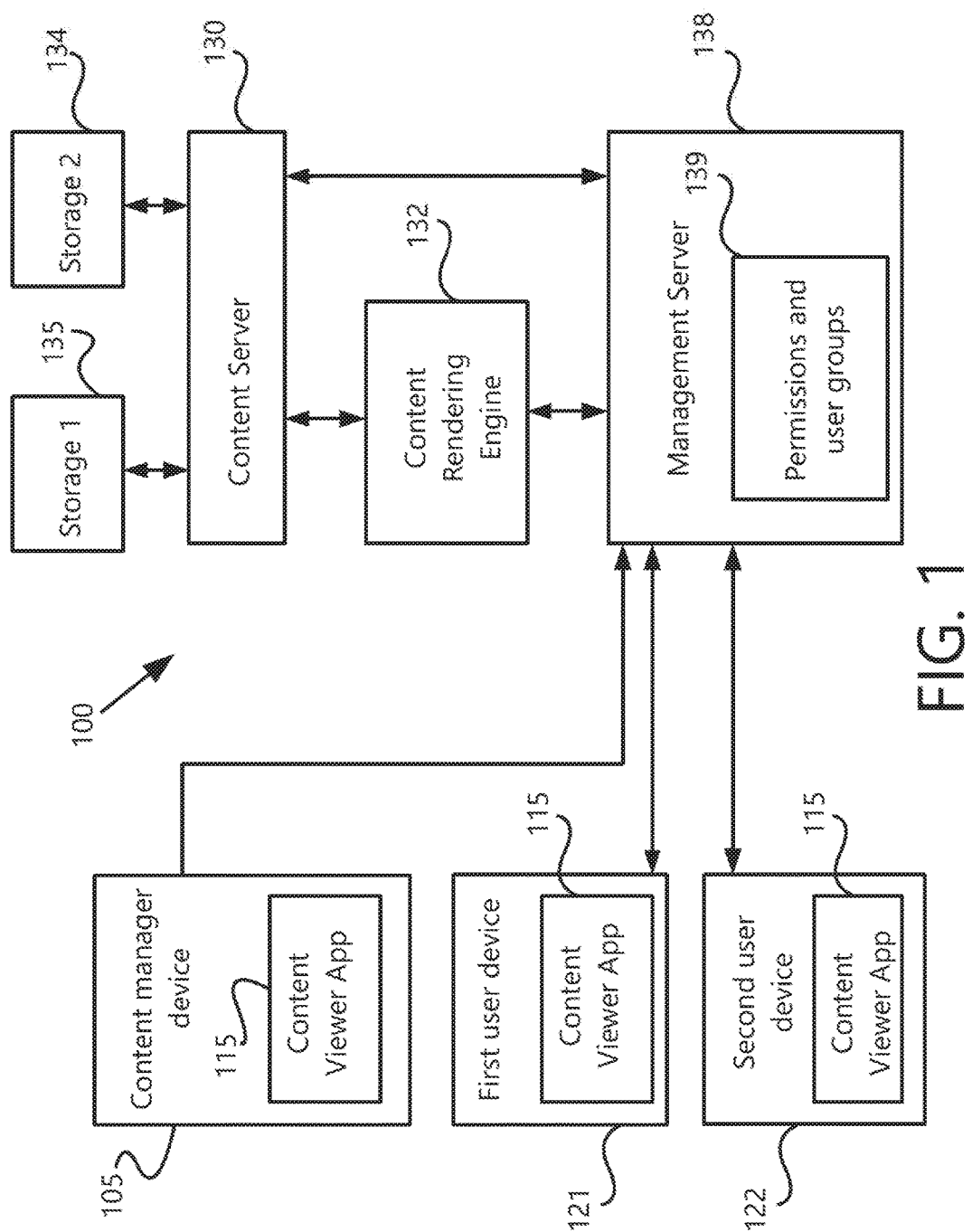

SYSTEMS FOR MODULAR DOCUMENT EDITING

BACKGROUND

Electronic documents such as word processor documents, presentations, spreadsheets, PDF documents, and others are commonly drafted and edited by multiple authors. User collaboration is especially common in a workplace environment. Large, multi-section documents can be created through contributions by multiple team members. This can involve saving the document in a shared folder where it can be accessed and edited by numerous users.

However, in a large document editing context, current document-sharing technologies have several technology-specific shortcomings. Current document-sharing technologies can put a strain on network bandwidth. Each time a user makes a small change to a document, the document must be entirely redistributed to any other user who wishes to perform an edit. This results in a nearly-identical document being replicated across the network to other users, consuming valuable network bandwidth. Where each version of a document is stored, this process can also negatively impact storage capacity. As employee counts, document numbers, and document sizes grow, the impact on enterprise network bandwidth and storage capacity increases. Additionally, remotely working on the document can become untenable based on the large amount of data that the user must download each time the user wants to edit a document.

For large files with many contributors, current document-sharing technologies also impose technical barriers to production. When a user checks out a document for editing, the user must check the document back in before another user can edit the document. This is inefficient when a large number of contributors need to edit different parts of the document. Users can be sitting idly waiting to check out the document for editing, causing an editing user to feel compelled to stop editing prematurely because they know another user is waiting. Or worse, the editing user might forget to check the document back in, needlessly delaying other users from editing other parts of the document.

Based on at least these problems specific to document-sharing and document-management technology, a need exists for systems for improved modular document editing.

SUMMARY

An example modular document viewing and editing system can deliver particular portions of a document to different users based on which portions of the document each user is permitted to edit. A content manager can designate permissions within a document, restricting at least one user to a first portion of the document. The first portion can include at least one object within at least one page of the document.

Permission controls can be stored at a management server. The system can use the permission controls to control which user devices can access particular pages and objects within the document.

The content manager device can upload the document to a content server. The content server can send at least the first portion of the document to a content rendering engine for processing. The content rendering engine can process at least the first portion by creating screen shots of individual pages that are part of the document, and building an information bundle to track where information should be displayed on the pages. The information bundle can include a document identifier, page identifiers for pages, and object identifiers for features within pages. Screen shots and information bundles can be stored at different repositories based on the role-based permissions. For example, the system can select repositories based on which user groups have permission to access the corresponding document portions.

When the first user requests access to the document, the content server can retrieve and send to a first user device a first screen shot bundle and first information bundle corresponding to the first portion. The first user device can execute a content viewer application that reads the first information bundle to assemble document content into a document that is viewable or editable on the first user device.

The content server can lock editing access to the first portion being edited by the first user. When the first user is done editing, the edited components can be uploaded back to the content server, and the first portion can be unlocked for further editing. In one example, this can include the content server sending the edited portion to the content rendering engine for processing and storage.

It is to be understood that both the foregoing general description and the following detailed description are exemplary and explanatory only and are not restrictive of the examples, as claimed.

BRIEF DESCRIPTION OF THE DRAWINGS

FIG. 1 is an exemplary illustration of system components.

DESCRIPTION OF THE EXAMPLES

Figure 2A:
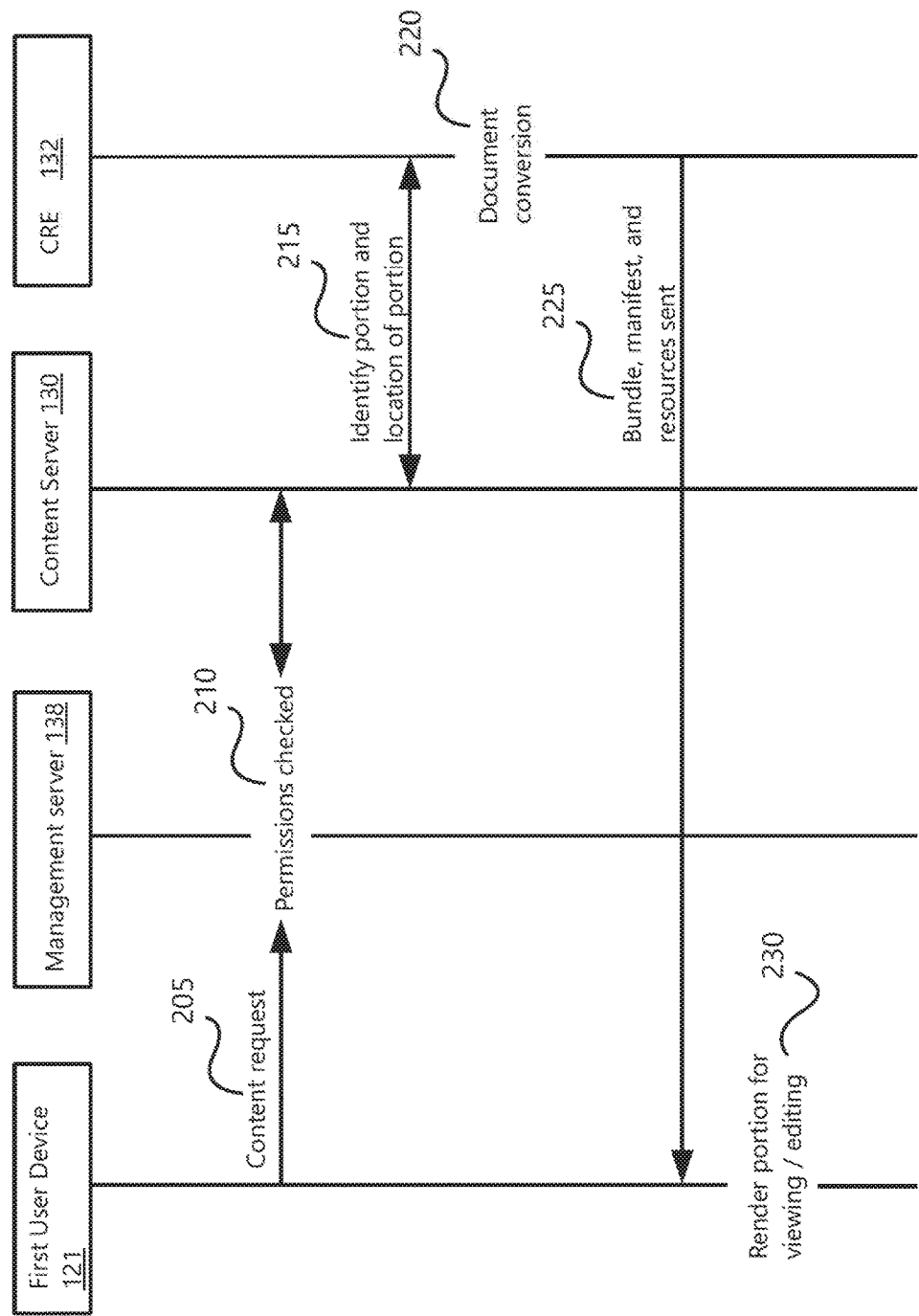
FIG. 2A is an exemplary method executed in a system.

Reference will now be made in detail to the present examples, including examples illustrated in the accompanying drawings. Wherever possible, the same reference numbers will be used throughout the drawings to refer to the same or like parts.

Examples described herein include systems for modular document editing. Unlike current document sharing technologies, a system herein can assign role-based permissions for pages and objects within a document. The system can distribute to a user only the pages and objects that the user is permitted to access. The system can also re-assemble edited portions of the document back into a full document, allowing multiple users to work on their permitted portions at the same time—a challenge particular to file sharing technologies.

When a user device requests the document, the system can provide only permitted portions based on role-based permissions assigned to the user and one or more portions of the document. This can improve existing technological processes that limit synchronous editing and consume valuable network bandwidth by repeatedly sending large documents to many editing users. Additionally, an example system can allow different portions of a document to be stored in different file storage locations that have different role-based access permissions. This can address security and bandwidth problems rooted in file-sharing technologies and networks.

FIG. 1 illustrates an exemplary system 100 for modularized document access. A content manager can use a content manager device 105 to set access permissions within a document. The document can be any type of electronic file, such as a word processor document, PDF, or spreadsheet. The term "content manager" is not meant to limit the examples and can include any user that sets permissions within a document.

The content manager device 105, first user device 121, and second user device 122 are examples of user devices. A user device can be any computing device, such as a cell phone, laptop, tablet, personal computer, or workstation. While particular types of electronic documents are referred to in examples, systems described below can operate with any electronic file type. Each user device 105, 121 and 122 can include a non-transitory computer-readable medium containing instructions that are executed by a processor in the user device 105, 121 and 122. Examples of a non-transitory computer-readable medium include RAM and ROM, disks, and other memory and storage that is accessible by a USB port, a floppy drive, CD-ROM, or DVD-ROM drive, and a flash drive, among others. The instructions can cause the user device 105, 121 and 122 to carry out stages necessary to execute a content viewer application 115 and communicate with a content server 130 and a management server 138.

The user devices 105, 121, and 122 can communicate with a content server 130, management server 138, and content rendering engine (CRE) 132 over a server-based network. One or more of the devices 105, 121, 122, 130, 132, and 138 can include an interface for communicating over the network. The network can include the Internet, a local area network, or any other suitable communication platform. The interface can include one or more modulators, demodulators, multiplexers, demultiplexers, network communication devices, wireless devices, antennas, modems, and any other type of device configured to enable data communication through a communication network.

The content manager device 105 can be any computing device used by a content manager to author or assign permissions to a document. The permissions can determine which users can access one or more portions of the document. The permissions can also determine what document controls are available to the user for the permitted portion. Example document controls assignable to a portion include opening, editing, commenting, printing, and emailing. The document controls can define which activities the user is permitted to perform on the portion.

The first user device 121 can be used by a first user to perform permitted activities on one or more portions designated by the document manager. Similarly, the second user device 122 can be used by a second user to perform permitted activities within the document.

In one example, the content manager can use the content manager device 105 to set permissions specific to portions of the document. The permissions can be different for different users or groups of users, permitting different access or permitted activities for different portions. In one example, when a portion of the document is assigned permissions, the content manager device 105 can send the permission selections to the content server 130. The permission selections can be stored and transmitted as part of the document, in one example.

Based on permission selections, the content server 130 can divide the document into smaller parts (e.g., portions) for managing and distributing. In one example, this can include splitting the document into sub-parts representing different portions of the document, and storing the sub-parts separately. A first sub-part can be stored in a first repository 135, while a second sub-part can be stored in a second repository 134. The repositories 134 and 135 can be located on different servers at different physical locations in one example. Access permissions for the repositories 134 and 135 can be different for different user groups. In one example, the storage location of a sub-part can be determined by the system based on which repositories are accessible by a group of users with permission to access the sub-part. The terms "sub-part" and "portion" are used interchangeably herein. Both represent less than the full document.

A content repository 134 or 135 can lock a document sub-part (e.g., portion) for editing when the user checks out the sub-part. However, other sub-parts can remain available for editing, unlike many other document management systems. This can address the technology-specific lockout situations caused by existing document management systems that check an entire document out at the same time, hampering simultaneous or overlapping work efforts.

The content repositories 134 and 135 can each include separate content rendering engines (CREs) 132 in one example. Alternatively, the repositories 134 and 135 can both communicate with a shared CRE 132. In another example, the repositories 134 and 135 can each act as a content server 130. Alternatively, they can communicate with an outside content server 130 that manages some or all interactions with the repositories 134 and 135.

In one example, the content server 130 can track the most recent versions of each sub-part. When a content manager device 105 or other user device having full access requests the document, the content server 130 can combine the most recent sub-parts into a full version of the document. In one example, the content server 130 can include annotations in each sub-part of the full document noting the last edit date and time, and the user that performed the edit. The content server 130 can then send the full version of the document to the requesting user device. The portions of the document that a particular user lacks privileges to edit can be sent and displayed in read-only format while authorized portions are edited.

In another example, the content server 130 can send the document or a sub-part to a content rendering engine 132 for parsing into information that can be utilized by a content viewer application 115. In one example, the content rendering engine 132 can parse at least a portion of the document to create an information bundle and a screen shot bundle. Portions with different assigned permissions can be parsed into separate information and screen shot bundles. In another example, the content rendering engine 132 can parse the entire document and create an information bundle and screen shot bundle for the entire document.

The content rendering engine 132 can be part of the content server 130 in an example. In another example, the content rendering engine 132 can be a separate server.

In one example, a content viewer application 115 can execute on the user devices 105, 121, and 122. The content viewer application 115 can interpret the information bundles and screen shot bundles in order to display a permitted document portion. A screen shot of the page can visually represent the page, and the information bundle can instruct the content viewer application 115 regarding the metadata of objects visually displayed in the screenshot. For example, the information bundle can identify various objects within the screen shot, and include information regarding object type, location, and formatting. In one example, the information bundle can define which objects within the document a content manager can select for assigning access permissions.

The content viewer application 115 can, for example, allow the user device 105, 121, or 122 to view and edit a permitted document portion without using the native software used by the content manager device 105 to create the document. In one example, this can allow users to be productive on virtually any user device 105, 121, or 122 registered with the management server 138. For example, the content viewer application 115 can be a web-based application that operates within a browser, such as an HTML 5 browser. The content viewer application 115 can be a plugin in another example.

The content viewer application 115 can utilize Application Program Interface (API) calls to interact with the content rendering engine (CRE) 132 in one example. For example, the content viewer application 115 can request that the CRE 132 render content by calling an API subroutine at the CRE. This can cause the CRE 132 to render an information bundle, such as a JSON-formatted object. The request from the content viewer application 115 can include a file identifier, a security token, and a name or other information that the CRE can use to recognize type. The request can further include a watermark to apply to the rendered content, such as a JSON-formatted watermark. The request can also include metadata to be saved with the rendered content.

The request can also include permissions data, such as a JSON-formatted object, that describes actions at least one user is allowed to do. For example, the permissions data can set permissions for downloading, copying, printing, emailing, and other functions. The permissions data can be a string in one example, such as: {download: true, copy: true, print: true}. JSON-formatted objects can be URL-encoded in an example.

The content rendering engine 132 can respond to the request by returning an address, such as a uniform resource locator (URL) to retrieve the information bundle. The information bundle can also be URL encoded in an example.

Another API subroutine can allow the content viewer application 115 to get a content manifest from the CRE 132. The content manifest request can include a file identifier, a version identifier, and security token. The CRE 132 can respond with an address for the manifest or by providing a manifest object, such as a JSON-formatted object. The content manifest can include information about the content, such as the size of the content, the pages included in the content, and where the pages are located.

Another API subroutine can allow the content viewer application 115 to retrieve an information bundle from the CRE 132. For example, the content viewer application 115 can request one or more information bundles that were rendered in response to the "content render" subroutine and included in the manifest. The information bundle request can include data describing resources used for each page and can identify the manifest. The information bundle can also identify objects in a page, such as a text layer for editing. The information bundle can be a JSON-formatted object in one example.

In another example, the content viewer application 115 can call separate subroutines to retrieve an image bundle, such as thumbnails or full-size images of pages corresponding to a manifest or information bundle. Another subroutine can allow the content viewer application 115 to retrieve a resource identified in the information bundle from a repository 134 or 135, CRE 132, content server 130, or outside file hosting service.

To save network bandwidth, the content server 130 or CRE 132 can, for example, send only the permitted portion of the document to the first user device 121. In more detail, the first user device 121 can request the document, or one or more portions of the document, from the content server 130. In response, the content server 130 can send only the portions meeting user-specific or role-based permissions for the first user device 121. The content server 130 can make the determination based on receiving a permission credential from the first user device 121. Alternatively, the content server 130 can receive the permission credential from a management server 138. In another example, the first user device 121 can request only a first portion even if it has access to multiple portions, and the content server 130 will only deliver the first portion.

The management server 138 can store permission information for each user device 105, 121, and 122. The management server 138 can manage which users correspond to which user devices 121 and 122. The management server 138 can also associate the users with access permissions 139. In one example, the management server 138 can supply the content manager device 105 with multiple user groups or roles that the content manager can choose between when assigning permissions to portions of the document. The management server 138 can track which roles (e.g., groups) correspond to which user devices 121 and 122. Permissions and related associations can be stored in a non-transitory computer-readable medium accessible by the management server 138.

The management server 138 can include one or more servers. Each server can include one or more processors that executes instructions stored on a non-transitory computer-readable medium. The content server 130 can similarly include one or more servers and processors. In one example, the management server 138 and content server 130 are part of the same server or cluster of servers.

The management server 138 and content server 130 can communicate over a network with user devices, such as content manager device 105, first user device 121, and second user device 122. In one example, the management server 138 can make procedure calls to a management component running on a user device 105, 121, or 122, or change settings of the content viewer application 115. This can include installing new versions of the content viewer application 115, limiting which files or sub-parts the content viewer application 115 can open, or uninstalling the content viewer application 115.

In one example, the management server 138 can send a message to the user devices 121 and 122 of a particular permissions group to notify the users that a portion of a document is accessible by users in the group. The management server 138 can also cause a representation of the portion to appear in a list of documents available in a managed application running on user devices 121 and 122 in the permissions group.

In one example, the first user can request permission to access portions of the document that are not available to the first user under the first user's current role. The first user device 121 can send a request to the management server 138, which can send a message to the content manager device 105. The content manager can then select whether to change the access setting for the first user. If the content manager grants permission, the content manager device 105 can notify the management server 138, which can update the permissions 139 to grant the first user device 121 an elevated role with regard to the document or the requested portion. In one example, the management server 138 can track document-specific role exceptions separately from which role the user devices otherwise correspond to.

The management server 138 can also manage the content viewer application 115. For example, the content viewer application 115 or first user device 121 can include a management component that allows the management server 138 to set permissions within the content viewer application 115. This can include restrictions on certain activities, such as printing or emailing, for all users, particular users, or groups of users.

Through use of a management component, the management server 138 can lock the first user device 121 into particular applications and portions of a document. In one example, this can cause the first user to remember to check the one or more portions back in so that the management server 138 will unlock other device functionality.

The management component can include a device-level component (e.g., application programming interface (API), agent application, hypervisor, or virtualized device) and an application-level component (e.g., API, SDK, app wrapper, or workspace agent app). The device-level management component can include system level privileges. The application-level management component can include privileges in managed applications such as the content viewer application 115, which can be developed for operation with the management server 138. Reference to the management component is understood to include either or both of the device-level and app-level components unless otherwise specified.

The management server 138 can interact with the management component with calls to the application (e.g., application level) or operating system (e.g., device level) of a user device 121 or 122. In one example, based on a permissions control for the portion, the management server 138 can lock the first user device 121 into the content viewer application 115. The management server 138 further can turn functionality on and off within the content viewer application 115 through calling subroutines in the management component. If a permission control specifies it, the management server 138 can turn off functionality at the first user device 121, such as printing, emailing, or Internet access. This can allow for added security when viewing or editing particularly sensitive document portions.

In addition, the management server 138 can utilize the management component to uninstall the content viewer application 115 or delete the first portion that was sent to the first user device 121. This can be done, for example, if the first user device 121 is lost or if an employee leaves the job.

The management server 138 can store permissions controls for a plurality of user devices 121 and 122 in a database in one example. The database can include one or more software or hardware components that cooperate to store, organize, sort, filter, or arrange data used by system 100. For example, the database can include user account information, group or role information, device settings, and other user preferences or restrictions. The database can also contain multiple databases that are communicatively coupled to one another or the processor, which can be one of multiple processors utilized by the management server 138 or a computing device 121 or 122. In one example, the database can include one or more tables that store a device identifier, operating system type, and an identifier for one or more managed applications on the device.

The content server 130 can also utilize a database in one example. This can allow a content server 130 to track the versions and locations of documents and portions of documents. The database can similarly track location and versions of information bundles in an example.

The devices 105, 121, 122, 130, 132, and 138 can each utilize one or more processors. The term "processor," as generally used herein, can refer to any logic processing unit, such as one or more central processing units (CPUs), digital signal processors (DSPs), application specific integrated circuits (ASICs), field programmable gate arrays (FPGAs), and similar devices. The processor can include one or more processors, each configured to execute instructions and process data to perform one or more functions associated with system 100. The processor can be communicatively coupled to a RAM, ROM, storage, database, I/O module, or interface module. A processor can be configured to execute sequences of computer program instructions to perform various processes, which will be described in detail below. The computer program instructions can be loaded into RAM for execution by the processor.

The devices 105, 121, 122, 130, 132, and 138 can also include an I/O module, such as a console with an integrated keyboard and mouse to allow a user to input parameters associated with system 100. An I/O module can also include a display including a graphical user interface (GUI) for outputting information on a screen.

FIG. 2A is an exemplary flow chart with example steps for preparing a document sub-part for access by a first user device 121. At stage 205, the first user device 121 can request content. In one example, the first user can select an available document through use of the content viewer application 115 or other application managed by the management server 138.

The documents available for selection can be limited to only those that the first user has permission to access. This can include checking permissions for the first user device 121 at stage 210. For example, the management server 138 can receive a list of files and check the permitted users or roles for the file against the roles assigned to the first user. Alternatively, the content viewer application 115 and content server 130 can determine the files available to the first user device 121. In the later example, the management server 138 can send permission information to the first user device 121. The management server 138 can do so by communicating with or configuring permissions within the content viewer application 115. Then, the content viewer application 115 can supply the permission information to the content server 130 when requesting a list of available documents. The content server 130 can utilize the permission information to only supply a list of relevant documents.

The content request of stage 205 can specify one or more portions of the document in one example. The content viewer application 115 can cause the first user device 121 to list the portions available to the first user. Then the first user can select the portions to access, generating the content request.

In another example, the first user device 121 submits a content request at stage 205 for the entire document, but the content server 130 can determine to send only one or more portions back to the first user device 121. To do this, the content server 130 can compare the permission information for the first user to assigned permissions for portions of the document. Based on which portions are permitted for the first user, the content server 130 can identify the one or more portions at stage 215.

At stage 215, identifying the portion to send to the first user device 121 can include also identifying the location of the portion. The content server 130 can store metadata for the document that tracks repository locations for each portion.

Additionally, if the content request of stage 205 is initiated by the content viewer application 115, the content server 130 can determine if an information bundle and screenshot bundle exists for the portion. This can include contacting the content rendering engine (CRE) 132 to request the bundles. The information bundle can describe the features of each page. The information bundle can also include a manifest in an example. The manifest can identify document information, such as document version, file name, number of pages, page size, and the application for opening the document.

If the CRE 132 has not yet created or no longer maintains an information bundle for the portion, at stage 220 it can perform document conversion. The CRE 132 can parse the pages and objects that are part of the portion, creating an information bundle and a screenshot bundle for the portion. For example, the CRE 132 can create a screenshot of a page, and parse that screenshot into information that is added to the information bundle. The information bundle can describe the pages of the portion, and can be a JSON file type. Using one or more information bundles, permissions can be assigned to specific objects within a document. This can result in multiple JSON files that can be assigned to different users and collectively reassembled to form the full document.

Once the CRE 132 determines the bundles for the portion exist, then at stage 225 the bundles can be sent to the first user device 121. In one example, the content server 130 can retrieve the bundles from the CRE 132 and send the bundles to the first user device 121. In another example, the bundles can be sent by the CRE 132 directly to the first user device 121.

The content server 130 or CRE 132 can also send resources relevant to the information bundle in one example. Resources can include fonts, styles, object images, tables, figures, and other supplemental data that the content viewer application 115 can use to properly display a page or object for viewing or editing. In one example, the first user device 121 can determine whether it already has the needed resources. If not, then it can request additional resources from the CRE 132 or content server 130.

At stage 230, the first user device 121 can render the portion for viewing and editing by the first user. This can include the content viewer application 115 displaying at least one screen shot from the screen shot bundle and defining objects within the screen shot based on the information bundle. This can allow the user to, for example, select a text region and edit the text. It can also allow a user to modify a table or figure. Modifying a specialized element such as a table or figure can also rely on resources that correspond to the specialized element. For example, a resource can define table cell boundaries and allow for execution of table formulas, so that the user can change individual entries and effect other entries.

Figure 2B:
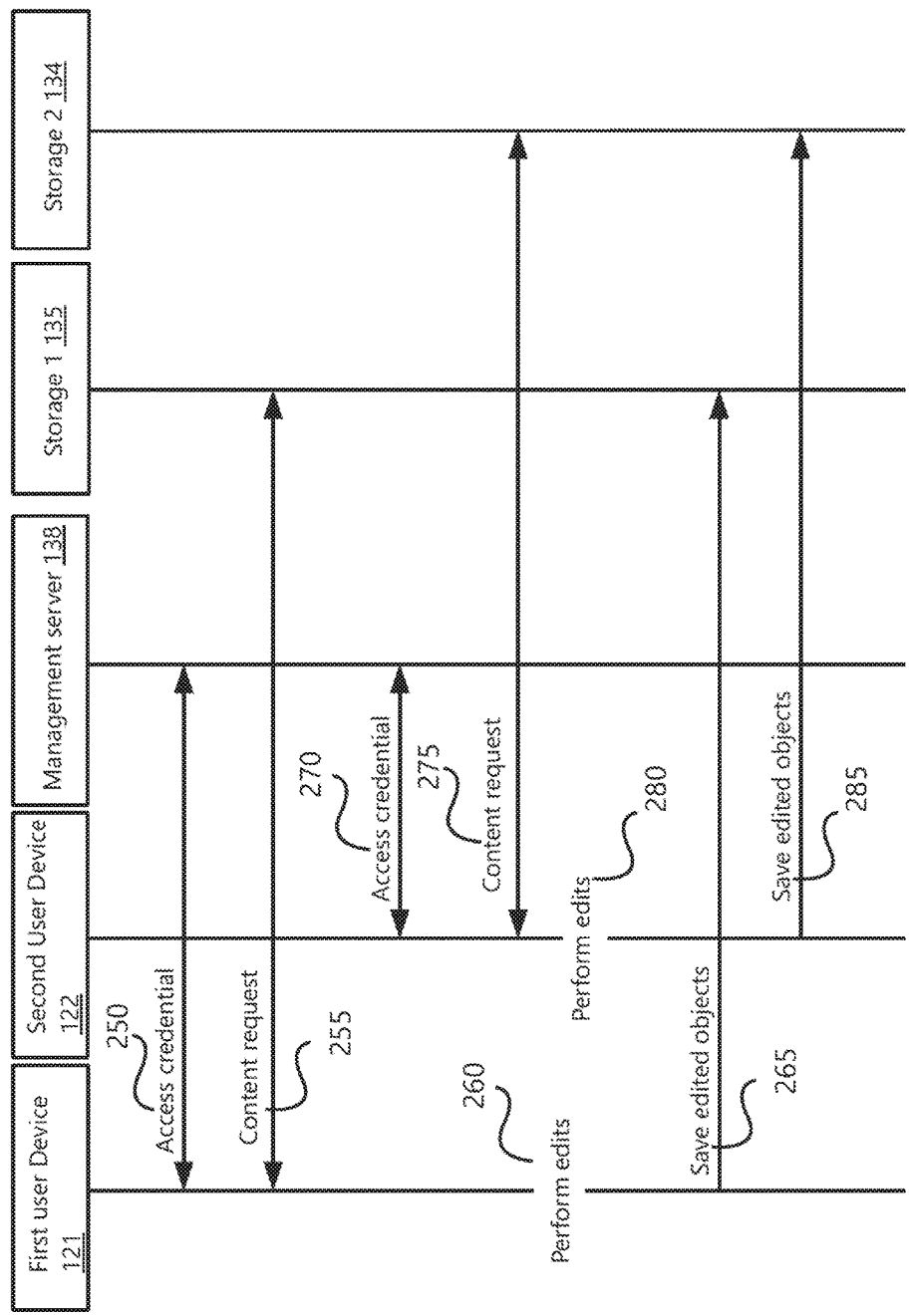
FIG. 2B is an exemplary method executed in a system.

FIG. 2B is an exemplary flow chart with example steps for simultaneously editing different document sub-parts. FIG. 2B further illustrates several technology-specific improvements over existing document management systems. The improvements include simultaneous or overlapping editing by different users, split storage of a single document according to permissions groups, and network bandwidth reduction.

At stage 250, the first user device 121 requests an access credential from the management server 138. In one example, the access credential can be a token that the first user device 121 can use to receive a permitted document sub-part. The request can be included as part of a document request, such as at stage 255, in one example. The management server 138 can determine one or more permission controls (e.g., role-based or group-based) associated with the first user device 121. Then, the management server 138 can supply the access credential (e.g., a token) to the first user device 138 for accessing content or a storage location that is permitted for that permission control.

The access credential can allow the first user device 121 access to a first repository 135 in an example. The first repository 135 can permit access only to user devices with an access credential based on a particular permission control. The permission control can be associated with a role or group of users. The first user device 121 can supply the access credential as part of a content request (e.g., document request) at stage 255. Based on the access credential and a document identifier, the first repository 135 can return a first portion of the document. The first portion can be a sub-part of the document that the first user device 121 is permitted to access. At least another portion of the document can be stored on a second repository 134, to which the first user device 121 access credential does not permit access.

The system 100 can determine how to split portions of the document across different repositories based on the permission controls associated with the portions. For example, a first user group can access the first repository 135, and a second user group can access the second repository 134. If a first permission control specifies that a first portion of the document is accessible by only a first user group, then the management server 138 or content server 130 can store the first portion in the first repository 135. Likewise, when the second portion is designated as editable by the second user group, the second portion can be stored in a second repository 134 based on the overlap in permission controls.

Continuing with FIG. 2B, in response to the content request at stage 255, the first repository 135 can send the first portion to the first user device 121. This can include less than the full amount of content in the first portion in one example. For example, the first repository 135 can send an information bundle to the first user device 121 that specifies multiple objects and resources that can be assembled to create the first portion. The first user device 121 might already have some of these objects and resources stored locally, such as fonts, images, or screen shots. In one example, the first user device 121 can request additional resources from the first repository 135 that the first user device 121 does not already have access to locally. This can again help to minimize network traffic generated during the document viewing or editing process.

At stage 260, the first user device 121 can edit the received first portion. In one example, the user opens the portion within a managed application (e.g., content viewer application 115) that can determine which objects are edited. For example, the user can modify a text layer by typing new text within the text layer. The managed application can track those edits in an edited information bundle. The text layer can keep the same object identifier, so that the CRE 132 can reconcile the edited text layer with the original. The edits can also include adding new objects to the first portion, such as additional pages, charts, figures, tables, images, and other objects.

Meanwhile, at stage 270, a second user device 122 can receive an access credential (e.g., token) from the management server 138. The management server 138 can determine that the second user device 122 belongs to a different user group or is otherwise assigned a different permissions role than the first user device 121. As a result, the second user device 122 can be permitted to access a second portion of the document, different from the first portion being edited by the first user device 121.

The second portion can be stored at separate location than the first portion, such as a second repository 134. The second repository 134 can be accessed by the second user device 122. The second repository 134 can be selected by a content server 130 or management server 138 based on a permission match between the user group or role assigned to the second portion and access permissions assigned to the second repository 134. In another example, the second repository 134 is selected by the content server 130 based on network proximity to users that can access the second portion.

At stage 275, the second user device 122 can request the second portion from the second repository 134. The request can be directed to the second repository 134 by a content server 130 or the management server 138 in one example.

Once the second portion is received, the second user device 122 can edit the second portion at stage 280. Thus, both the first and second user devices 121 and 122 can edit different portions of the document simultaneously without conflict and without waiting for the other to check the document back in.

At stage 265, the first user device 121 can save the edited first portion. This can include uploading only an edited information bundle back to the first repository 135. This can reduce traffic in an enterprise network. For example, instead of sending an entire document, only a first portion of the document is being transmitted. In addition, only information regarding edited objects within the first portion are sent back to the first repository 135, in one example. In that example, instead of sending unedited pictures, graphs, and other objects of the first portion, the edited information bundle can identify the text layer and the text that is now within it. If a new resource is added to the first portion, the first user device 121 can also send the resource to the first repository 135. This can address problems specifically arising in the realm of computer networks when files are constantly redistributed based on minor edits.

Similarly, at stage 285 the second user device 122 can send edited objects to the second repository 134. This can include sending the full second portion in one example. Alternatively, only an edited information bundle and new resources can be sent.

The content manager device 105 that created the document or set permissions within it can retrieve the entire document. In one example, the system can retrieve the first and second portions from the first and second repositories 135 and 134 for assembly into a single document. The assembly can be performed by the content viewer application 115 executing on the content manager device 105. In another example, the portions can be merged together by the content server 130 or management server 138, and sent to the content manager device 105 as a single file.

Figure 3:
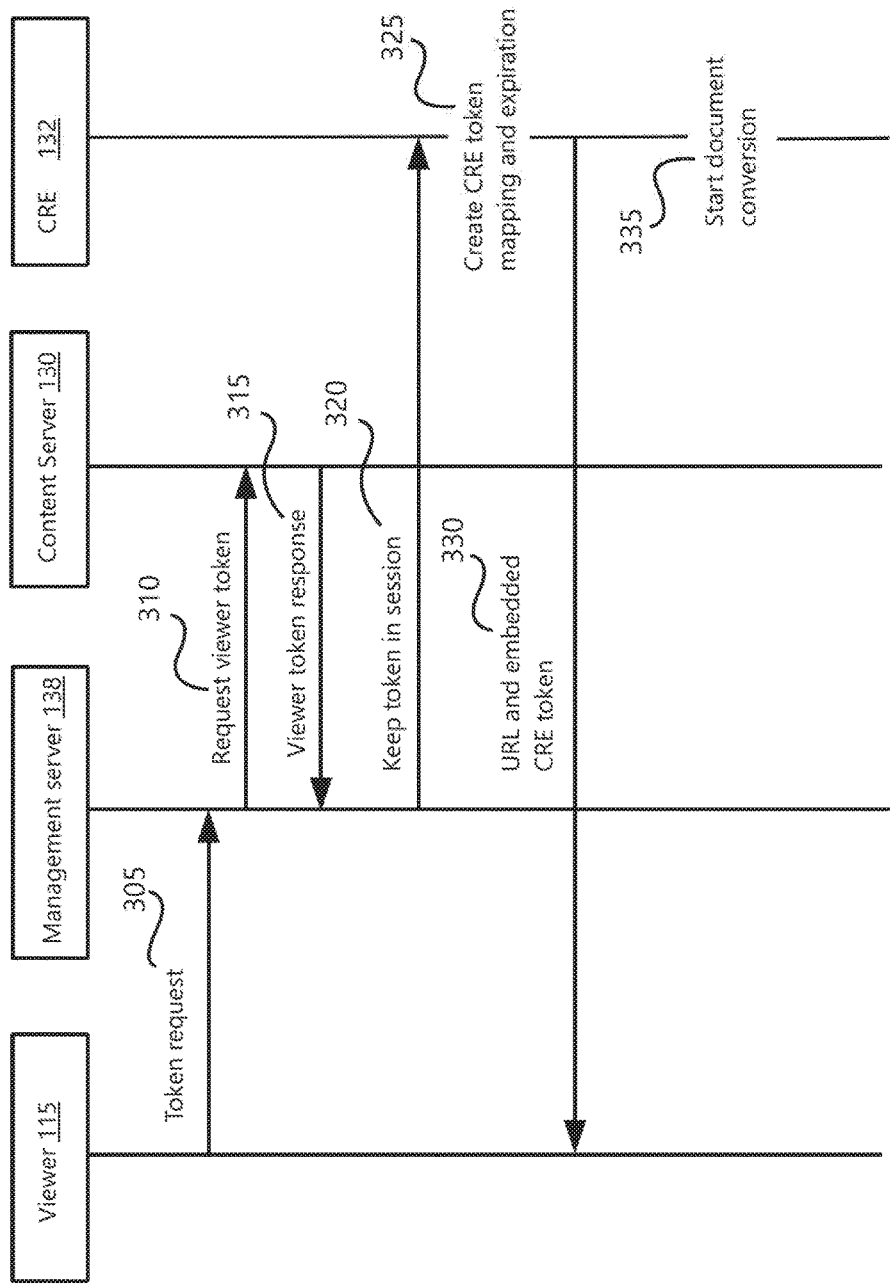
FIG. 3 is an exemplary method executed in a system.
Figure 4:
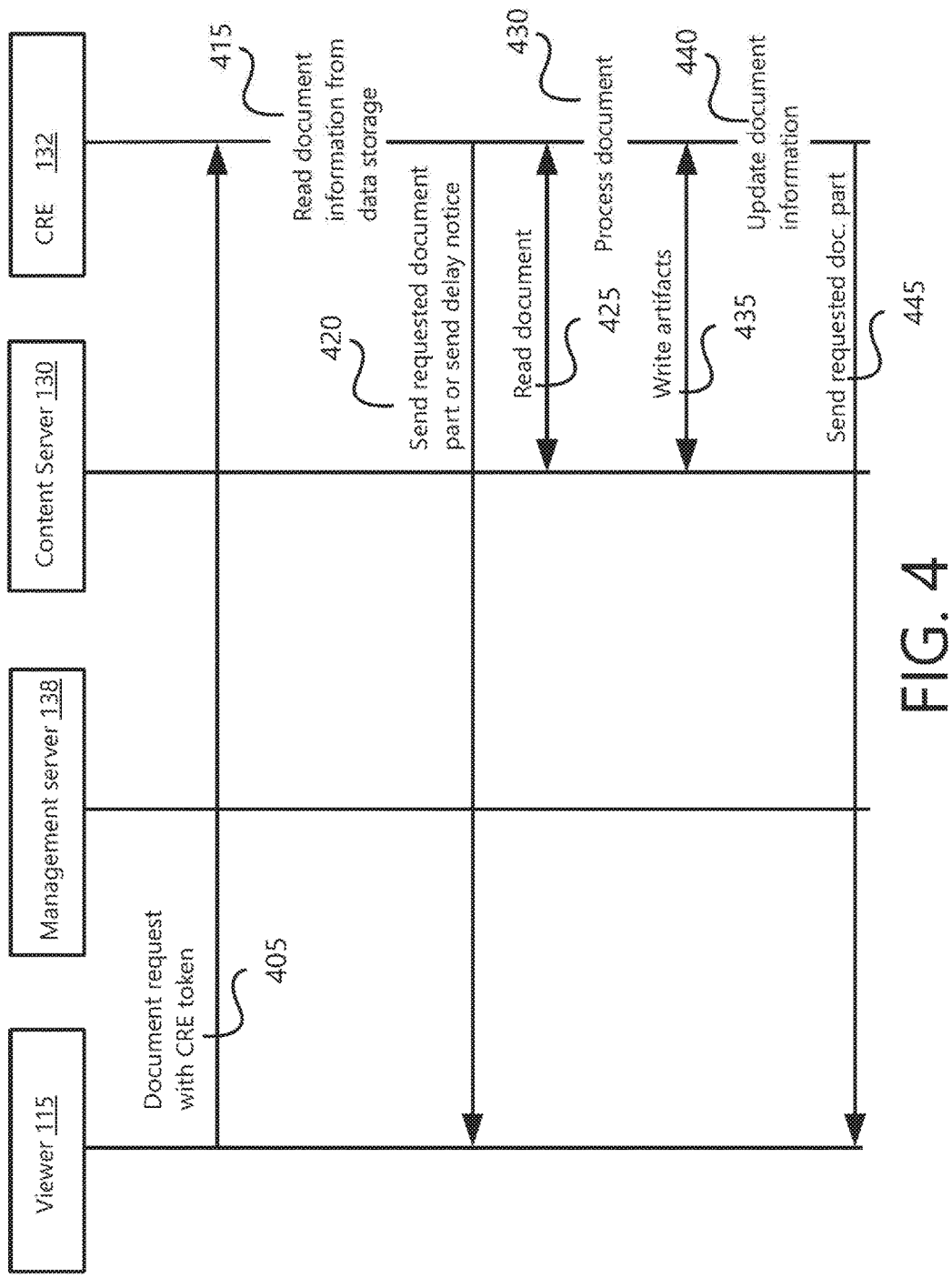
FIG. 4 is an exemplary method executed in a system.
Figure 5:
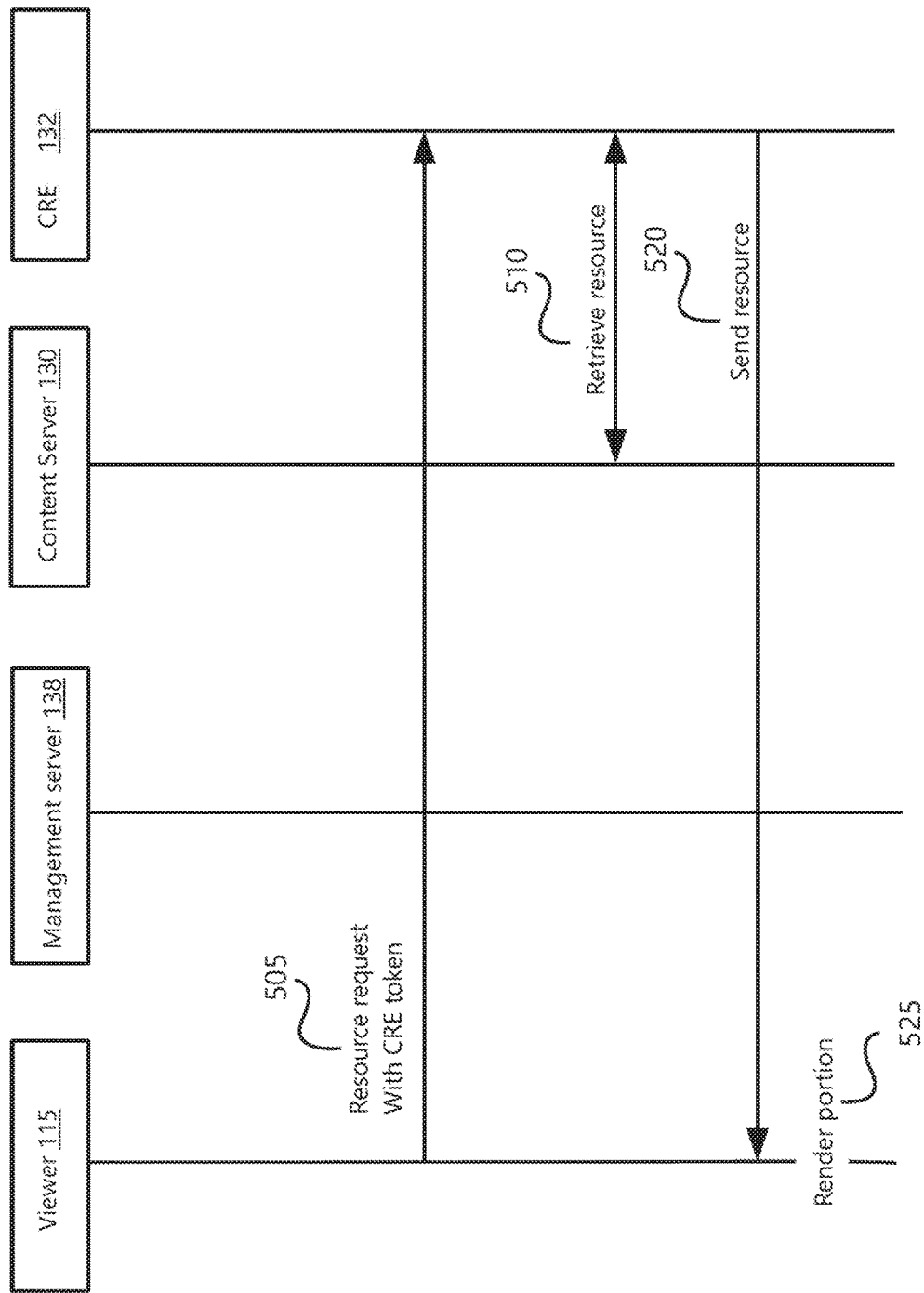
FIG. 5 is an exemplary method executed in a system.

FIGS. 3-5 provide additional exemplary details regarding communications between system devices during document portion (e.g., sub-part) editing. FIG. 3 is an example flow chart for a content viewer application 115 retrieving a token for use in retrieving a document portion from the CRE 132. The token can allow an instance of the content viewer application 115 executing on the first user device 121 to request and receive information from the CRE 132. For example, if the content viewer application 115 requests a document portion, it can communicate with CRE 132 to receive the portion. In one example, before sending the portion, the CRE 132 can create or identify the requisite information bundle and screen shot bundle. The token can allow the content viewer application 115 to check with the CRE 132 to determine if the portion is ready to be downloaded to the first user device 121.

To establish a connection with the CRE 132, the content viewer application 115 can request a token at stage 305. In one example, the token request can be included in the content request of stage 205 in FIG. 2. The content viewer application 115 can communicate the request to the management server 138 in one example.

At stage 310, the management server 138 can request a token from the content server 130 for communicating with the content server 130 or CRE 132. In one example, the management server 138 can supply the content server 130 with permission information associated with the first user. The content server 130 can insert information into a token that identifies the document or document portion. For example, the content server 130 can include a document identifier in the token.

At stage 315, the content server 130 can respond by passing the token for use by the content viewer application 115 back to the management server 138. The content server 130 can also assign activity privileges to the token, such as write access, print access, email access or others if the applicable document sub-part is not already checked out. Otherwise, read-only access can be assigned.

At stage 320, the management server can redirect the token to the CRE 132 instead of forwarding the token to the content viewer application 115. The redirect can allow the CRE 132 to establish a session with the content viewer application 115. The session can allow the content viewer application 115 to transact directly with the CRE 132 in one example. This can allow the CRE 132 to create bundles for sub-parts without the viewer 115 continuously requesting the content from the management server 138 or content server 130. This can free up the management server 138 and content server 130 to communicate more effectively with other devices and perform other functions.

At stage 325, the CRE 132 can create a second token (e.g., an embedded CRE token) based on the first token received from the management server 138. The second token can map the first user device 121 to the permitted sub-part (e.g., portion) of the document at the CRE. In one example, the second token can include an address, such as a uniform resource locator (URL), so that the content viewer application 115 can call the CRE 132 to request components of the sub-part. The CRE token (e.g., second token) can also include identifying information for the first user device 121, so that the CRE 132 can validate incoming requests from the first user device 121 with regard to the sub-part.

At stage 330, the embedded CRE token (e.g., second token) and address are sent to the content viewer application 115. This can also include sending the viewer token that contains activity privileges previously set by the content server 130. The content viewer application 115 can use the CRE token to retrieve bundles and resources from the CRE 132. A CRE or viewer token can be used to communicate updated content and check the modified sub-part back in at the CRE 132 or content server 130.

At stage 335, the CRE can convert the document or sub-part into information bundles and screen shot bundles. When this is complete, the content viewer application 115 running on the first user device 121 can use the CRE token to access the converted document or sub-part.

Turning to FIG. 4, an example flow chart for a document request utilizing the CRE token is presented. At stage 405, the content viewer application 115 can request the document or sub-part (e.g., portion) from the CRE 132. The CRE token can include an address, such as the URL, that allows the content viewer application 115 to directly contact the CRE 132. The CRE 132 can verify that the session has not yet expired by checking the information in its corresponding CRE token.

If the session has not yet expired, at stage 415 the CRE 132 can read stored document information referenced in the CRE token or the document request. This can allow the CRE 132 to determine the applicable portion (e.g., sub-part) to retrieve for the instance of the content viewer application 115 executed by the first user device 121. The CRE 132 can then locate the portion (e.g., sub-part) identified by the CRE token or document information. This can include locating all bundles associated with the sub-part.

At stage 420, the CRE 132 can send the bundles associated with the sub-part to the content viewer application 115. This can also include sending resources that are utilized by the bundles.

Alternatively, if an updated sub-part does not yet exist (e.g., the CRE 132 has not yet created the bundles or the prior bundles are no longer the latest version), at stage 420 the CRE 132 can send a delay notice to the content viewer application 115. The delay notice can cause the content viewer application 115 to wait a scheduled amount of time before re-requesting the document at the CRE 132. In one example, the CRE 132 can set the scheduled amount of time based on the size and number of existing document conversion tasks scheduled at the CRE 132. This can further address the technical issue of repeated device requests, which can needlessly raise traffic levels on an enterprise network.

Meanwhile, the CRE 132 can process the document or sub-part in stages 425, 430, 435, and 440. At stage 425, the CRE 132 can read the document. This can include requesting the document from the content server 130 if it is not already accessible at the CRE 132.

Figure 7:
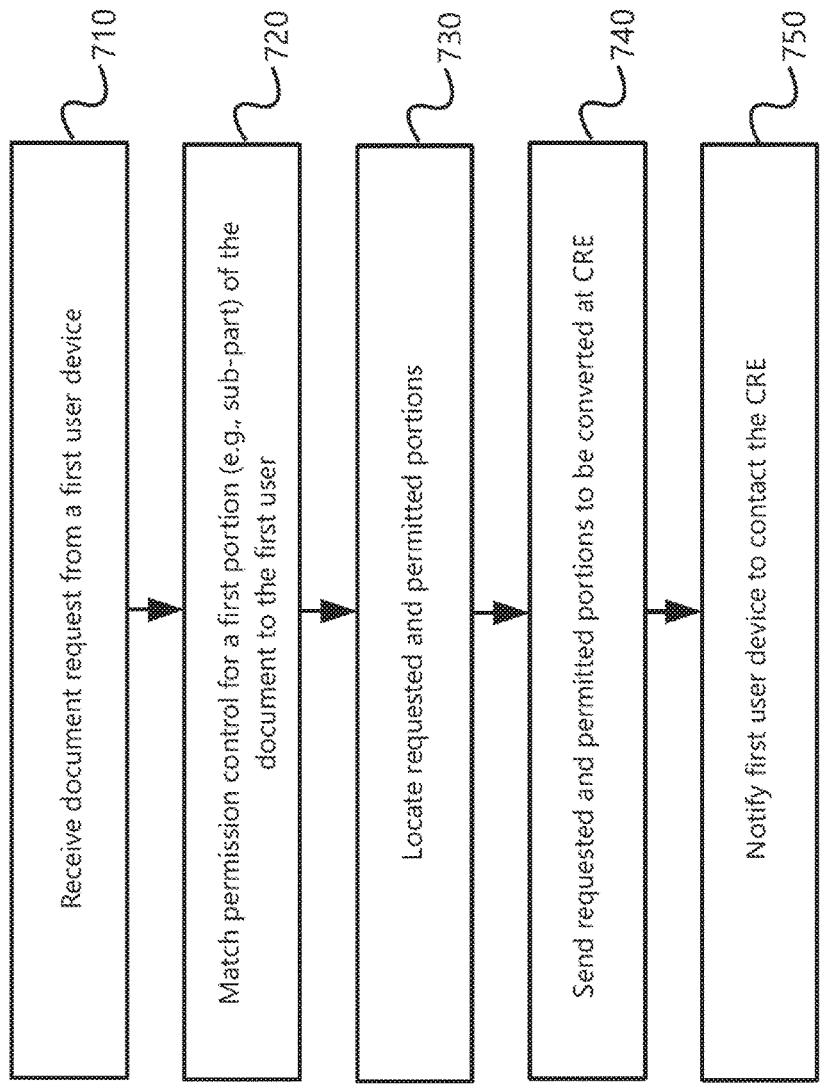
FIGS. 7 and 8 are exemplary methods for implementing modular document viewing and editing.

At stage 430, the CRE 132 can process the document by scanning pages and creating information bundles. In one example, the CRE 132 only processes the portion being requested by the first user device 121. In another example, the CRE 132 processes the entire document so that it can assemble additional portions without further input from the content server 130. Processing the document can include parsing metadata and content on at least one page, and creating an information bundle based on object model (such as is shown in FIG. 7). For one or more pages, the CRE 132 can create a screen shot in one example. The page can be assigned a page identifier that is associated with a bundle identifier for the portion.

The information bundle can include the bundle identifier and the page identifier. In addition, the information bundle can specify the page type (e.g., program type), address (e.g., URL) to the native document portion, and page size information. The information bundle can also specify one or more images that are on the page, one or more fonts used on the page, and one or more text layers for text content.

At stage 435, the CRE 132 can write artifacts related to the document or sub-part. The artifacts can include a screen shot of one or more pages and a thumbnail for use as a preview by the content viewer application 115. The artifacts can also include a manifest file, a display list, or other information in the information bundle. The manifest can include basic information about the document, such as the name, document version, pages, and document type. A display list can be a separate file that includes coordinates for each object or element in the information bundle.

At stage 440, the CRE 132 can update the document information associated with the document or sub-part. This can include notifying the content server 130 that the sub-part is created and available for user access. This can allow the content server 130 to cause permitted user devices to display the sub-part as available.

The content viewer application 115 can make another request to the CRE 132 at the scheduled time received from the CRE 132 at stage 420. In response, at stage 445, the sub-part (e.g., portion) can be sent to the content viewer application 115. This can include sending one or more information bundles and screen shot bundles in one example. From the information bundle, the content viewer application 115 can determine which resources it already has locally and which resources it needs to obtain. This can save bandwidth by not repeatedly sending redundant resources.

In another example, the content viewer application 115 can make a series of requests to the CRE 132 to retrieve all the information for rendering the document sub-part. For example, the content viewer application 115 can make one or more bundle requests for the page bundles and information bundles. It can separately request a manifest in one example. And can further request one or more resources upon determining that the first user device 121 does not already have all of the resources referenced in the information bundle.

In one example, when a user attempts to edit content within the content viewer application 115, the content viewer application 115 can determine which object and location is being edited. An edited information bundle can be created locally for the edits. The modification information bundle can include a display list to track the location of the edits or edited objects. Then, the edited information bundle can be sent back to the CRE 132 in one example. This can further address the technology-specific network bandwidth issue by sending only edits to the CRE 132, which can then reconstruct the information bundle for the sub-part to capture the edits based on the edited information bundle.

Turning to FIG. 5, an example flow chart for requesting additional resources is presented. At stage 505, the content viewer application 115 can request a resource from the CRE 132, utilizing the CRE token. The content viewer application 115 can trigger this action based on failure to match a resource identifier in the information bundle to an internal list of locally-available resources. In one example, resources can also have a version identifier or date, and the content viewer application 115 can request a resource if it does not have the version of the resource specified in the information bundle. The resource request can include one or more of the resource identifiers and version identifiers.

The CRE 132 can receive the resource request and retrieve the corresponding one or more resources at stage 510. The CRE 132 can first check to see if it already has the resource. If not, it can contact the content server 130 and request the resource.

At stage 520, the CRE 132 or content server 130 can send the one or more requested resources to the content viewer application 115. If the resource cannot be procured within a short period (e.g., 1 second), the CRE 132 can instead send a delay notice as described for stage 420 of FIG. 4.

Once the resources have been received, at stage 525 the content viewer application 115 can render the portion (e.g., sub-part). This can include rendering a page with the objects and resources specified in the information bundle. The content viewer application 115 can also use a screen shot of the page in performing the rendering.

Figure 6:
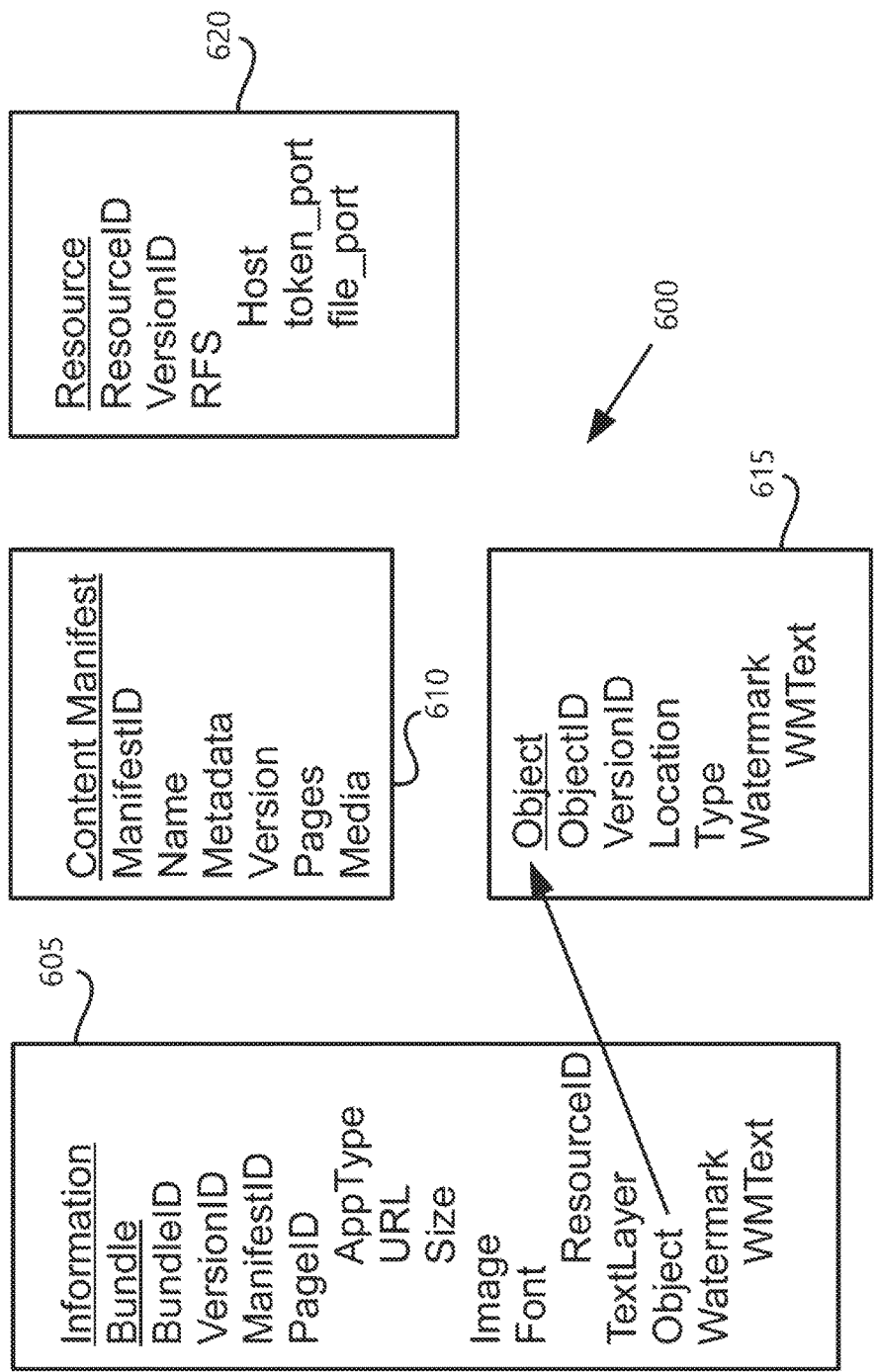
FIG. 6 is an exemplary illustration of an object model for use with an information bundle.

FIG. 6 illustrates an example schema 600 that can be used for content rendering using information bundles and resources. An information bundle 605 can be an XML file, text file, JSON file, or other delimited file type in one example. The information bundle 605 can include a bundle identifier and a page identifier. An information bundle 605 can include multiple files, such as one for each page. A page can have a unique page identifier. The information bundle can include a bundle identifier, and can reference associated pages by page identifier. Additionally, the information bundle 605 can include an address (e.g., URL) for locating the page (e.g., at the CRE 132). The information bundle 605 can also specify the application type (e.g., AppType) for opening the page, the location of the page (e.g., URL), and the size of the page (e.g., Size).

The bundle can also identify a manifest 610, such as by including a ManifestID. The manifest 610 can be included in the information bundle, or can be a separate file. The manifest 610 can include information about the document, such as the name, the version, the document type (e.g., Media), document metadata, and the number of pages. Document metadata can identify the content manager or document creator. Document metadata can further identify historical information regarding when and who edited or accessed the document. The metadata can also include permissions information in one example.

The information bundle 605 can reference one or more images (e.g., Image) that appear on the page. It can also reference one or more fonts (e.g., Font) that can be associated with text within one or more text layers (e.g., TextLayer). The text layer can be rendered on top of a screen shot to provide text editing capability while maintaining the original look of the page in one example. In one example, the TextLayer is a type of Object 615 that is described in the information bundle 605.

The information bundle 605 can also include a vector or list of objects 615 that are on the page (e.g., PageID). An object 615 can include an object identifier (e.g., ObjectID), version identifier (e.g., VersionID), and location on the page (e.g., Location). The Location can specify X and Y coordinates or otherwise define the object boundaries in relation to the page. The type of object (e.g., Type) can also be identified, such as graph, table, image, or others. The object can contain its own watermark (e.g., Watermark), which can allow the system to track a user edit or addition of an object even when the user cannot access the full page that the object is within. Watermark text (e.g., WMText) can include information identifying the user and historical edit information, such as edit dates and identification of prior users that edited the object. Similar watermark information can be tracked for the information bundle 605 in an example.

When specifying an image, font, text layer, or object, the information bundle 605 can reference one or more resources 620 in an example. The resource 620 can define what is being displayed by the content viewer application 115. For example, a particular font can be a resource. As another example, a particular table format can be a resource. An image or other object can also be a resource. The information bundle 605 can reference a resource identifier and a version identifier for an object in one example. This can allow the content viewer application 115 to determine if the first user device 121 already has access to the resource (and the correct version) locally.

If the first user device 121 does not already have the resource, then it can use address, host, and token information to contact the correct server and access the resource in one example. As an example, the resource information can include address information (e.g., RFS) for a remote file storage location where the resource is located. This can include a host address, port information for supplying a token, and port information for accessing a file associated with the resource.

This can help address problems in file sharing technologies that otherwise require downloading an entire file, including all objects and resources, every time any object or resource within a file changes. In aggregate, only downloading new or changed resources can save significant network bandwidth.

FIG. 7 is an example method for handling a document request. At stage 710, the system can receive a document request from a first user device 121.

At stage 720, the system, such as management server 138, can match a permission control for a first portion of the document to the first user device 121. This can allow the system to determine that the first user device 121 can access the first portion. The system can similarly determine if the first user device 121 can access other portions of the document.

After the permitted portions are identified, at stage 730 the system can locate the permitted portions. Optionally, at stage 740, if any of the permitted portions are not yet converted to information bundles the system can send the requested and permitted portions to the CRE 132 for conversion.

At stage 750, the system can notify the first user device 121 to contact the CRE 132. For example, the management server 138 can send a message to the first user device 121 in one example. The management server 138 can call a subroutine in a managed application, such as the content viewer application 115, and supply the CRE 132 contact information as an input parameter to the subroutine. Alternatively, at stage 750, the CRE 132 can provide the content to the first user device 121 by contacting the first user device 121 and utilizing a token recognized by the first user device 121.

Figure 8:
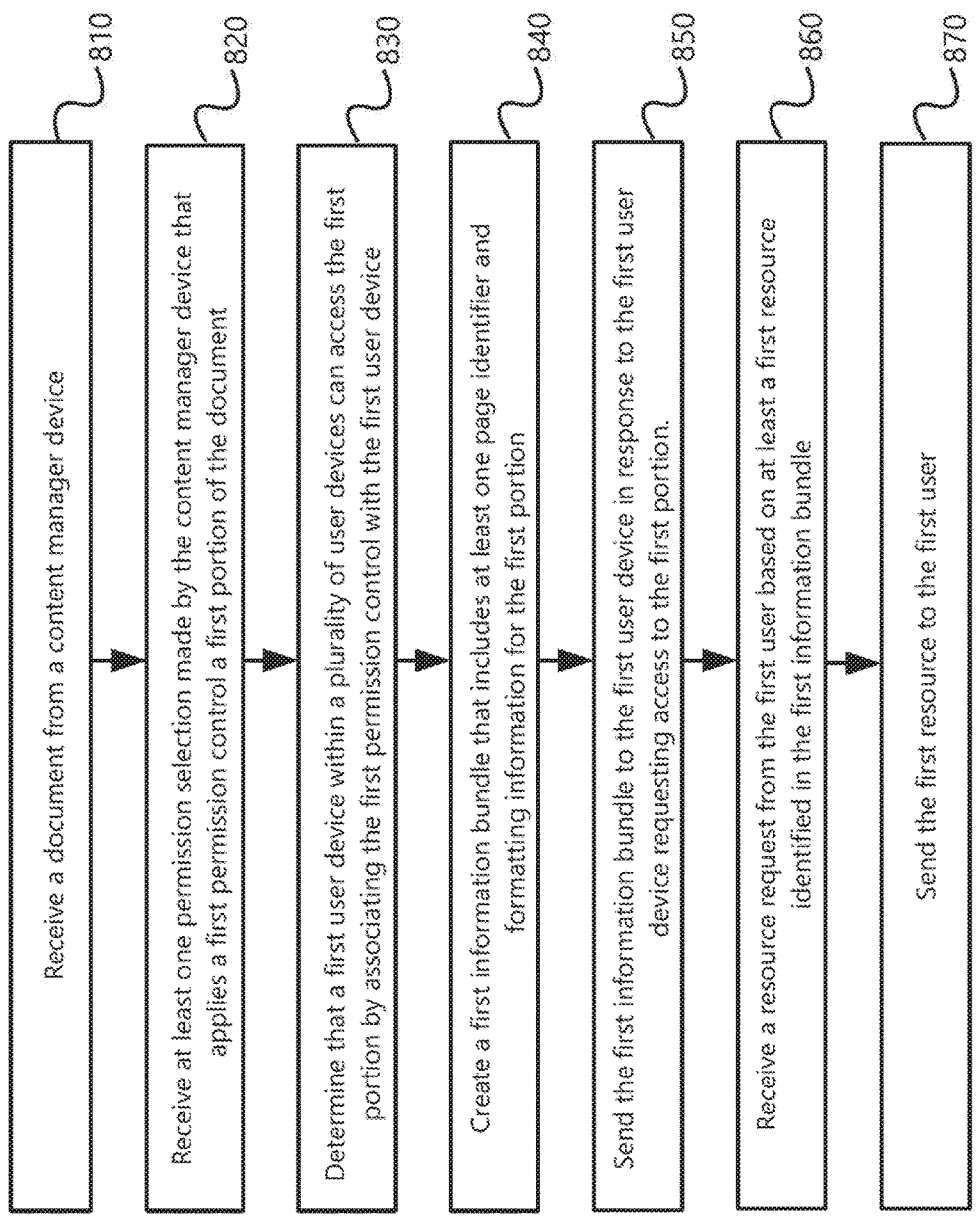

FIG. 8 is an example method for modular file sharing. At stage 810, the system can receive a document from a content manager device 105. The document can be sent from a managed application that provides the content manager device 105 a mechanism for setting different permissions in different portions of the document.

At stage 820, the system can receive at least one permission selection made by the content manager device 105 that applies a first permission control to a first portion of the document. This can be received separately from the document in one example, or as part of the document in another example. A content manager can place the first permission control on the first portion of the document by selecting the first portion and selecting permission criteria. For example, the content manager could highlight a page within the document, and select a role or group of users that can edit the page. The managed application can create the first permission control based on that selection. The permission control can be saved as part of the document.

At stage 830, the system can determine that a first user device 121 can access the first portion. The system can make this determination, for example, by comparing the permission control to a stored association of permissions and user devices. The first user device 121 can be one user device associated with the permission control.

At stage 840, the system can create a first information bundle that includes a page identifier and formatting information for the first portion. This can be done in response to receiving a request to access the first portion in one example.

Alternatively, the system can perform stage 840 after detecting that the first portion has different permissions selections (e.g., for access or editing) than another part of the document. The system can also create a screenshot bundle in one example.

At stage 850, the system can send the first information bundle to the first user device 121. This can be done in response to receiving a request for the first portion from the first user device 121. In one example, the first user device 121 can request the entire document, which can include requesting the first portion. The management server 138 can determine that less than the entire document is permitted, and cause the CRE 132 or content server 130 to only send the permitted portion(s).

At stage 860, the system can receive a resource request from the first user device 121. The requested resource can be a resource that is identified in the first information bundle. At stage 870, the system can send the resource to the first user device 121. In this way, the system can cut down on wasted bandwidth by only sending resources when they are needed.

Other examples of the invention will be apparent to those skilled in the art from consideration of the specification and practice of the examples disclosed herein. Though some of the described methods have been presented as a series of steps, it should be appreciated that one or more steps can occur simultaneously, in an overlapping fashion, or in a different order. The order of steps presented are only illustrative of the possibilities and those steps can be executed or performed in any suitable fashion. Moreover, the various features of the examples described here are not mutually exclusive. Rather any feature of any example described here can be incorporated into any other suitable example. It is intended that the specification and examples be considered as exemplary only, with a true scope and spirit of the invention being indicated by the following claims.

What is claimed is:

1. A system for modular document management, the system comprising:
    a content server, having a processor and a memory device, that receives a document from a content manager device, the document created by a native application and including a first permission selection associated with a first portion of the document and a second permission selection associated with a second portion of the document, the first and second permission selections being different;
    a management server, having a processor and a memory device, for: storing permission controls for a plurality of user devices;
    determining that a first user device within the plurality of user devices can access the first portion by associating a permission control for the first user device to the first permission selection;
    based on the determination, allowing the first user device access to the first portion; and
    instructing a content rendering engine to:
    obtain the first portion from the content server;
    create a first information bundle that includes:
    at least one page identifier corresponding to at least one page of the document;
    object information comprising the type and location of at least one object present in the first portion, and
    formatting information for the first portion to instruct the first user device to format the first portion for display by a non-native application, based, at least in part, on the at least one page identifier, object information, and formatting information;
    send the first information bundle to the first user device in response to the first user device requesting access to the first portion;
    obtain a first token from the management server based on the first user device requesting access to the first portion;
    create a second token based on the first token received from the management server;
    send the second token to the first user device
    after sending the first information bundle, receive a resource request from the first user device for a resource identified in the first information bundle, the resource request including the second token; and
    send the resource to the first user device.

2. The system of claim 1, wherein the first permission selection pertains to a group of users that the management server associates with at least the first user device and a second user device.

3. The system of claim 1, wherein the content server further stores the first portion in a first repository that is accessible by the first user device, and stores the second portion in a second repository that is inaccessible by the first user device.

4. The system of claim 3, wherein the management server further provides an access credential that allows the first user device access to the first repository, wherein the first information bundle is stored in the first repository.

5. The system of claim 1, wherein the content rendering engine is further instructed to:
    create a first screenshot bundle that includes a screenshot for each of the at least one page identifiers in the first information bundle; and
    send the first screenshot bundle to the first user device in response to the first user device requesting access to the first portion.

6. The system of claim 1, wherein the management server, based on the determination, allows the first user device to access the first portion but restricts the first user device from printing the first portion.

7. The system of claim 1, wherein the management server causes the first user device to be locked into the non-native application for editing the first portion of the document.

8. A non-transitory, computer-readable medium containing instructions executed by at least one processor to perform stages for modular document management, the stages comprising:
    receiving a document from a content manager device;
    receiving at least one permission selection made by the content manager device that applies a first permission control to a first portion of the document and a second permission control to a second portion of the document, the first and second permission controls being different;
    storing permission controls for a plurality of user devices;
    determining that a first user device within the plurality of user devices can access the first portion by associating the first permission control with the first user device;
    creating a first information bundle that includes:
    at least one page identifier corresponding to at least one page of the document;
    object information comprising the type and location of at least one object present in the first portion, and
    formatting information for the first portion to instruct the first user device to format the first portion for display by a non-native application, based, at least in part, on the at least one page identifier, object information, and formatting information;

sending the first information bundle to the first user device in response to the first user device requesting access to the first portion;

receiving a first token based on determining that the first user device within the plurality of user devices can access the first portion;

creating a second token based on the first token and a content rendering engine that stores the first information bundle;

sending the second token to the first user device;

after sending the first information bundle, receiving a resource request from the first user device for a resource identified in the first information bundle, the resource request including the second token; and sending the resource to the first user device.

9. The non-transitory, computer-readable medium of claim 8, wherein the permission selection pertains to a group of users that a management server associates with at least the first user device and a second user device.

10. The non-transitory, computer-readable medium of claim 9, wherein the permission selection indicates a first group identifier that is one of a plurality of group identifiers stored by the management server and associated with the plurality of user devices.

11. The non-transitory, computer-readable medium of claim 8, the stages further including:
storing the first portion in a first repository that is accessible by the first user device; and
storing the second portion in a second repository that is accessible by a second user device.

12. The non-transitory, computer-readable medium of claim 8, the stages further including:
creating a first screenshot bundle that includes a screenshot corresponding to each of the at least one page identifiers in the first information bundle; and
sending the first screenshot bundle to the first user device in response to the first user device requesting access to the first portion.

13. The non-transitory, computer-readable medium of claim 8, the stages further including, based on the determination, allowing the first user device to access the first portion but restricting the first user device from printing the first portion.

14. A computer-implemented method for controlling access when sharing content, including:
receiving a document from a content manager device;
receiving at least one permission selection made by the content manager device that applies a first permission control to a first portion of the document and a second permission control to a second portion of the document, the first and second permission controls being different;
storing permission controls for a plurality of user devices;
determining that a first user device within the plurality of user devices can access the first portion by associating the first permission control with the first user device;
based on the determination, allowing the first user device to access the first portion;
creating a first information bundle that includes:
at least one page identifier corresponding to at least one page of the document;
object information comprising the type and location of at least one object present in the first portion, and
formatting information for the first portion sufficient to instruct the first user device to format the first portion for display by a non-native application, based, at least in part, on the at least one page identifier, object information, and formatting information;
sending the first information bundle to the first user device in response to the first user device requesting access to the first portion;
receiving a first token based on determining that the first user device within the plurality of user devices can access the first portion;
creating a second token based on the first token and a content rendering engine that stores the first information bundle;
sending the second token to the first user device;
after sending the first information bundle, receiving a resource request from the first user device for a resource identified in the first information bundle, the resource request including the second token; and
sending the resource to the first user device.

15. The computer-implemented method of claim 14, further including:
creating a first screenshot bundle that includes a screenshot for each of the at least one page identifiers in the first information bundle; and
sending the first screenshot bundle to the first user device in response to the first user device requesting access to the first portion.

16. The computer-implemented method of claim 14, further including storing the first portion in a first repository that is accessible by the first user device, and storing the second portion in a second repository that is inaccessible by the first user device.

17. The computer-implemented method of claim 14, further including locking first user device into an application that reads the first information bundle to display at least one page for editing within the first portion.

* * * * *